United States Patent
Lin et al.

(10) Patent No.: US 8,284,333 B2
(45) Date of Patent: Oct. 9, 2012

(54) 3-D IMAGE DISPLAY SYSTEM AND DISPLAY EQUIPMENT AND SHUTTER GLASSES THEREOF

(75) Inventors: Hsiang-Tan Lin, Keelung (TW); Chun-Chieh Chiu, Taoyuan County (TW); Shih-Chieh Lin, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 173 days.

(21) Appl. No.: 12/861,604

(22) Filed: Aug. 23, 2010

(65) Prior Publication Data

US 2011/0292308 A1     Dec. 1, 2011

(30) Foreign Application Priority Data

May 31, 2010   (TW) ................................ 99210316 U

(51) Int. Cl.
*G02F 1/1335*     (2006.01)
(52) U.S. Cl. ................. 349/13; 349/15; 349/98
(58) Field of Classification Search .......... None
See application file for complete search history.

(56) References Cited

U.S. PATENT DOCUMENTS

| | | | | |
|---|---|---|---|---|
| 4,025,161 A * | 5/1977 | La Roche | ........................ | 349/98 |
| 5,973,760 A * | 10/1999 | Dehmlow | ...................... | 349/102 |
| 6,020,945 A * | 2/2000 | Sawai et al. | .................... | 349/119 |
| 6,608,652 B1 * | 8/2003 | Yamazaki et al. | ............. | 348/752 |
| 7,068,241 B2 * | 6/2006 | Sato et al. | .......................... | 345/8 |
| 7,683,983 B2 * | 3/2010 | Zhong et al. | .................... | 349/98 |
| 2005/0237440 A1 * | 10/2005 | Sugimura et al. | ............... | 349/13 |
| 2010/0060721 A1 * | 3/2010 | Chen et al. | ....................... | 348/51 |
| 2011/0018882 A1 * | 1/2011 | Seong et al. | ................... | 345/520 |
| 2012/0050628 A1 * | 3/2012 | Cho et al. | ........................ | 349/13 |
| 2012/0105746 A1 * | 5/2012 | Min et al. | ......................... | 349/13 |

FOREIGN PATENT DOCUMENTS

TW            452303         *  8/2001

* cited by examiner

*Primary Examiner* — Mike Stahl
(74) *Attorney, Agent, or Firm* — Muncy, Geissler, Olds & Lowe, PLLC

(57) ABSTRACT

A 3D image display system includes a display equipment and a shutter glasses. The display equipment includes an LCD module. The LCD module has a linear polarizing unit and is able to generate an image light from the linear polarizing unit. The shutter glasses include two liquid crystal optical units, at least one linear polarizing unit, and at least one polarizing optical element. The linear polarizing unit is disposed between the polarizing optical element and the liquid crystal optical units. The image light passes through the polarizing optical element, the linear polarizing unit, and one of the liquid crystal optical units in sequence. When the image light passes through one of the liquid crystal optical units, the other liquid crystal optical unit blocks the image light.

12 Claims, 3 Drawing Sheets

3-D IMAGE DISPLAY SYSTEM AND DISPLAY EQUIPMENT AND SHUTTER GLASSES THEREOF

CROSS-REFERENCE TO RELATED APPLICATION

This application claims the benefit of Taiwan Patent Application No. 099210316, filed on May 31, 2010, which is hereby incorporated by reference for all purposes as if fully set forth herein.

BACKGROUND OF THE INVENTION

1. Field of Invention

The present invention relates to an image display system, and more particularly to a three-dimensional (3D) image display system and a display equipment and a shutter glasses thereof.

2. Related Art

Nowadays, display systems capable of displaying 3D images have been developed in the field of image display technology and enable modern people to enjoy a stereoscopic visual effect. Currently, a 3D image display system including a display equipment and a shutter glasses already exits. When a viewer watches an image shown by the 3D image display system, the viewer needs to wear the shutter glasses, thereby experiencing a stereoscopic visual effect.

In detail, in such a 3D image display system, the display equipment generally alternately displays left-eye frames served for a left eye and right-eye frames served for a right eye. The shutter glasses alternately block view of the eyes, such that the left eye can only see the left-eye frames, and the right eye can only see the right-eye frames, thereby enabling the viewer to feel that the images displayed by the display equipment are stereoscopic, and experiencing a stereoscopic visual effect.

SUMMARY OF THE INVENTION

The present invention provides a 3D image display system capable of providing a stereoscopic visual effect.

The present invention provides a display equipment applied to the 3D image display system.

The present invention provides a shutter glasses applied to the 3D image display system. The shutter glasses comprising two liquid crystal optical units, at least one polarizing optical element, and at least one linear polarizing unit disposed between the polarizing optical element and the liquid crystal optical units. An image light passes through the polarizing optical element, the linear polarizing unit, and one of the liquid crystal optical units in sequence. When the image light passes through one of the liquid crystal optical units, the other liquid crystal optical unit blocks the image light.

The present invention also provides a display equipment applied to a 3D image display system. The display equipment comprising an LCD module having a linear polarizing unit and capable of generating an image light from the linear polarizing unit; and a polarizing optical element disposed on a transmission path of the image light. The polarizing optical element is used for converting a polarization state of the image light from a linear polarization into a non-linear polarization.

The present invention also provides a 3D image display system. The 3D image display system comprises a display equipment and a shutter glasses. The display equipment comprises an LCD module, and the LCD module has a linear polarizing unit and is capable of generating an image light from the linear polarizing unit. The shutter glasses comprise two liquid crystal optical units, at least one linear polarizing unit, and at least one polarizing optical element. The linear polarizing unit is disposed between the polarizing optical element and the liquid crystal optical units. The image light passes through the polarizing optical element, the linear polarizing unit, and one of the liquid crystal optical units in sequence. When the image light passes through one of the liquid crystal optical units, the other liquid crystal optical unit blocks the image light.

The present invention also provides a 3D image display system. The 3D image display system comprises a display equipment and a shutter glasses. The display equipment comprises an LCD module and a polarizing optical element. The LCD module has a linear polarizing unit and is capable of generating an image light from the linear polarizing unit. The polarizing optical element is disposed on a transmission path of the image light and used for converting a polarization state of the image light from a linear polarization into a non-linear polarization. The shutter glasses comprise two liquid crystal optical units and at least one linear polarizing unit. The liquid crystal optical units and the linear polarizing unit are located on the transmission path of the image light, the image light passes through the polarizing optical element, the linear polarizing unit, and one of the liquid crystal optical units in sequence. When the image light passes through one of the liquid crystal optical units, the other liquid crystal optical unit blocks the image light.

Based on the above, when an image light is emitted from the display equipment, one of liquid crystal optical units of the shutter glasses allows the image light to pass through, and the other liquid crystal optical unit blocks the image light, such that the shutter glasses alternately block view of the left eye and right eye. When the display equipment alternately displays left-eye frames served for the left eye and right-eye frames served for the right eye, the 3D image display system of the present invention can provide images with the stereoscopic visual effect to the viewer through the shutter glasses.

In order to make the aforementioned and other objectives and advantages of the present invention comprehensible, embodiments accompanied with figures are described in detail below.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
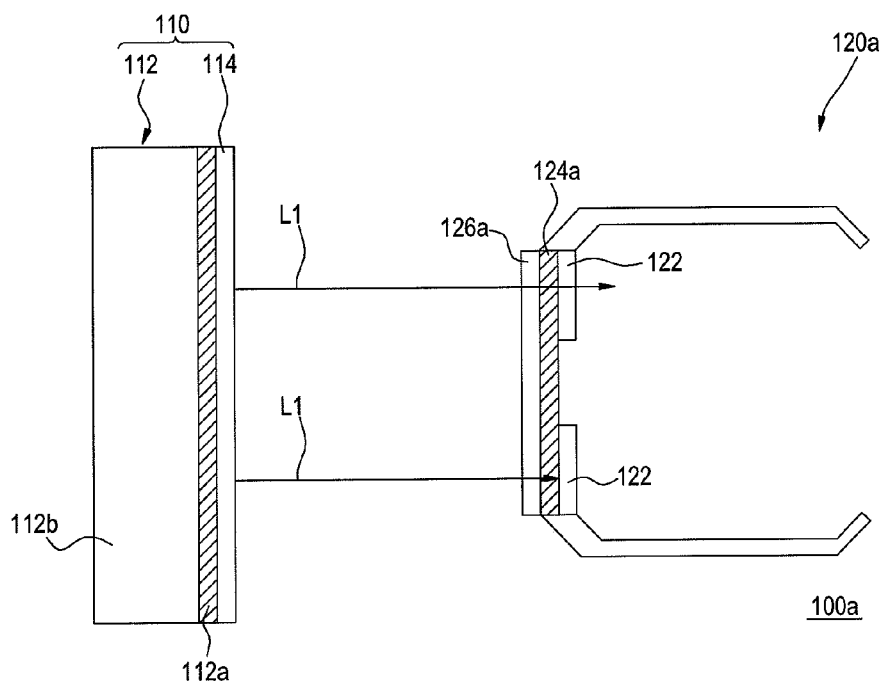
FIG. 1A is a schematic top view of a 3D image display system according to an embodiment of the present invention.

FIG. 1A is a schematic top view of a 3D image display system according to an embodiment of the present invention. Referring to FIG. 1A, a 3D image display system 100a in the embodiment includes a display equipment 110 and a shutter glasses 120a. The shutter glasses 120a alternately block view of the left and right eyes, and the display equipment 110 can alternately displays left-eye frames served for the left eye and right-eye frames served for the right eye.

A frequency at which the display equipment 110 alternately displays the left-eye frames and the right-eye frames may be consistent with a frequency at which the shutter glasses 120a alternately block view of the left and right eyes. When a viewer wears the shutter glasses 120a to watch images displayed by the display equipment 110, the shutter glasses 120a block view of the eyes of the viewer in a timely manner, such that the left eye of the viewer can only see the left-eye frames, and the right eye can only see the right-eye frames. Thus, the display equipment 110 can provide images with a stereoscopic visual effect for the viewer.

In the embodiment, the display equipment 110 applied to the 3D image display system 100a includes a liquid crystal display (LCD) module 112 and a polarizing optical element 114. The LCD module 112 has a linear polarizing unit 112a. The linear polarizing unit 112a may be substantially a linear polarizer, such that a linearly polarized light with a single polarization direction can pass through the linear polarizing unit 112a.

The LCD module 112 is capable of generating an image light L1 from the linear polarizing unit 112a, and the image light L1 may contain left-eye frames and right-eye frames. The LCD module 112 may be identical to an existing LCD module in terms of construction and display principles. In detail, the LCD module 112 may include the linear polarizing unit 112a and a display module body 112b. The display module body 112b includes an LCD structure (not shown) and a backlight module (not shown).

The LCD structure is located between the linear polarizing unit 112a and the backlight module. The backlight module can provide a planar light beam with uniform brightness, and the LCD structure and the linear polarizing unit 112a are combined to form an LCD panel. When the planar light beam passes through the LCD panel, the LCD module 112 generates the image light L1 from the linear polarizing unit 112a and thus can display images on the linear polarizing unit 112a.

The polarizing optical element 114 is capable of changing a polarization state of a light and converting the polarization state of the light from a linear polarization into a non-linear polarization. For example, the polarizing optical element 114 is capable of converting a linearly polarized light into a circularly polarized light, an elliptically polarized light, or a non-polarized light. The non-polarized light is such as a natural light.

The polarizing optical element 114 is disposed on a transmission path of the image light L1, and may be attached on the linear polarizing unit 112a. When the image light L1 is emitted from the linear polarizing unit 112a, the image light L1 subsequently passes through the polarizing optical element 114. The image light L1 just emitted from the linear polarizing unit 112a is a linearly polarized light, that is, a polarization state of the image light L1 at this time is a linear polarization. However, after the image light L1 passes through the polarizing optical element 114, the polarizing optical element 114 converts the polarization state of the image light L1 from the linear polarization into a non-linear polarization.

The polarizing optical element 114 may be a diffuser or a quarter-wave plate, and a light output surface of the diffuser may present an appearance of a matte surface or a glossy surface. When the polarizing optical element 114 is the diffuser, the polarizing optical element 114 is capable of converting the image light L1 into the natural light. The polarizing optical element 114 may convert the image light L1 by scattering, such that the image light is converted into the natural light.

When the polarizing optical element 114 is the quarter-wave plate, the polarizing optical element 114 has a fast axis and a slow axis, and is capable of converting the image light L1 into the circularly polarized light or the elliptically polarized light. In detail, when an included angle between a polarization direction of the linear polarizing unit 112a and the fast axis (or the slow axis) is equal to 45 degrees, the image light L1 is converted into the circularly polarized light. When the included angle between the polarization direction of the linear polarizing unit 112a and the fast axis (or the slow axis) is not equal to 45 degrees, and the polarization direction of the linear polarizing unit 112a and the fast axis or the slow axis do not overlap, the image light L1 is converted into an elliptically polarized light.

Since the polarizing optical element 114 is capable of changing the polarization state of the light and can convert the polarization state of the light from the linear polarization into the non-linear polarization, the polarization state of the image light L1 after passing through the polarizing optical element 114 is the non-linear polarization. That is to say, at this time, the image light L1 is, for example, the circularly polarized light, the elliptically polarized light, or the natural light, that is, the light of images presented by the display equipment 110 from the polarizing optical element 114 is no longer the linearly polarized light.

The shutter glasses 120a applied to the 3D image display system 100a includes two liquid crystal optical units 122, a linear polarizing unit 124a, and a polarizing optical element 126a. The linear polarizing unit 124a is disposed between the polarizing optical element 126a and the liquid crystal optical units 122, and the polarizing optical element 126a may be attached on the linear polarizing unit 124a. After being emitted from the display equipment 110, the image light L1 passes through the polarizing optical element 126a, the linear polarizing unit 124a, and one of the liquid crystal optical units 122 in sequence. When the image light L1 passes through one of the liquid crystal optical units 122, the other liquid crystal optical unit 122 blocks the image light L1.

In detail, the liquid crystal optical units 122 have a plurality of liquid crystal molecules. Arrangement of the liquid crystal molecules may be changed by applying an electric field and may enable the liquid crystal optical units 122 to allow a light with a certain polarization direction to pass through. When the image light L1 passes through the linear polarizing unit 124a and is converted into a linearly polarized light, the liquid crystal optical units 122 allow the image light L1 to pass through or block the image light L1 through the electric field applied on the liquid crystal molecules. Thus, the shutter glasses 120a enables the left eye of the viewer to see only the left-eye frames and the right eye to see only the right-eye frames.

The polarizing optical element 126a of the shutter glasses 120a may be identical to the polarizing optical element 114 of the display equipment 110, that is, the polarizing optical element 126a may be the diffuser or the quarter-wave plate, and the polarizing optical element 126a may be a diffuser having an appearance of a glossy surface. Therefore, the polarizing optical element 126a is also capable of changing the polarization state of the light, and the image light L1 emitted from the polarizing optical element 114 can pass through the polarizing optical element 126a and the linear polarizing unit 124a.

In detail, when the image light L1 after passing through the polarizing optical element 114 is the circularly polarized light, the elliptically polarized light, or the natural light, and the polarizing optical element 126a is the diffuser, the image light L1 after passing through the polarizing optical element 126a is still the circularly polarized light, the elliptically polarized light, or the natural light.

When the image light L1 after passing through the polarizing optical element 114 is the circularly polarized light or the elliptically polarized light, and the polarizing optical element 126a is the quarter-wave plate, the image light L1 is converted into the linearly polarized light after passing through the polarizing optical element 126a. However, at this time, the polarization direction of the image light L1 which is converted into the linearly polarized light is the same as the polarization direction of the linear polarizing unit 124a, so that the image light L1 can pass through the linear polarizing unit 124a, and enter to the liquid crystal optical units 122.

Based on the above, since the polarizing optical element 114 of the display equipment 110 is capable of converting the polarization state of the image light L1 into the non-linear polarization, for example, converting the image light L1 into the circularly polarized light, the elliptically polarized light, or the natural light, an included angle between the polarization direction of the linear polarizing unit 124a in the shutter glasses 120a and the polarization direction of the linear polarizing unit 112a in the display equipment 110 does not affect that the image light L1 passes through the shutter glasses 120a.

In other words, even if the included angle between the polarization direction of the linear polarizing unit 124a and the polarization direction of the linear polarizing unit 112a changes, the viewer wearing the shutter glasses 120a will not perceive any abnormal variation in brightness when viewing images of the display equipment 110. Therefore, the brightness of the images with the stereoscopic visual effect provided by the 3D image display system 100a of this embodiment is not affected by the polarization directions of the linear polarizing unit 124a and 112a.

It should be noted that the 3D image display system 100a also can not use the polarizing optical element 114 or 126a. That is to say, in the embodiment shown in FIG. 1A, the polarizing optical element 126a of the shutter glasses 120a or the polarizing optical element 114 of the display equipment 110 may be omitted, so that the 3D image display system 100a may use only one polarizing optical element, and the polarizing optical element belongs to the shutter glasses 120a or the display equipment 110.

When the 3D image display system 100a uses only one polarizing optical element (that is, the polarizing optical element 114 or 126a), the display equipment 110 still can normally display images, and the shutter glasses 120a still can block view of the eye of the viewer in a timely manner. That is to say, even if the polarizing optical element 114 or 126a is not used, the 3D image display system 100a can normally operate on the whole.

Moreover, the polarizing optical elements 114 and 126a are both capable of changing a polarization state of a light, so that even if the 3D image display system 100a uses only one of the polarizing optical element 114 and 126a, the included angle between the polarization direction of the linear polarizing unit 124a in the shutter glasses 120a and the polarization direction of the linear polarizing unit 112a in the display equipment 110 does not still affect that the image light L1 passes through the shutter glasses 120a.

In detail, when the 3D image display system 100a only uses the polarizing optical element 114 but does not use the polarizing optical element 126a, that is, only the polarizing optical element 114 of the display equipment 110 is used, the polarization state of the image light L1 emitted by the display equipment 110 from the polarizing optical element 114 is still the non-linear polarization, so that the image light L1 can still pass though the linear polarizing unit 124a of the shutter glasses 120a without blocked by the linear polarizing unit 124a.

On the contrary, when the 3D image display system 100a only uses the polarizing optical element 126a but does not use the polarizing optical element 114, that is, only the polarizing optical element 126a of the shutter glasses 120a is used, although the image light L1 emitted by the display equipment 110 is not converted into the linearly polarized light because the image light L1 does not pass though the polarizing optical element 114, the polarizing optical element 126a can convert the polarization state of the image light L1 from the linear polarization into the non-linear polarization. For example, the image light L1 is converted into the circularly polarized light, the elliptically polarized light, or the natural light, such that the image light L1 can pass through the linear polarizing unit 124a without blocked by the linear polarizing unit 124a.

It can be seen that no matter whether both the display equipment 110 and the shutter glasses 120a have polarizing optical elements, or only one of the display equipment 110 and the shutter glasses 120a has a polarizing optical element, the included angle between the polarization directions of the linear polarizing unit 124a and the linear polarizing unit 112a does not affect that the image light L1 passes through the shutter glasses 120a. Therefore, the polarizing optical elements 114 and 126a shown in FIG. 1A are merely illustrated as an example and not limited the invention.

Figure 1B:
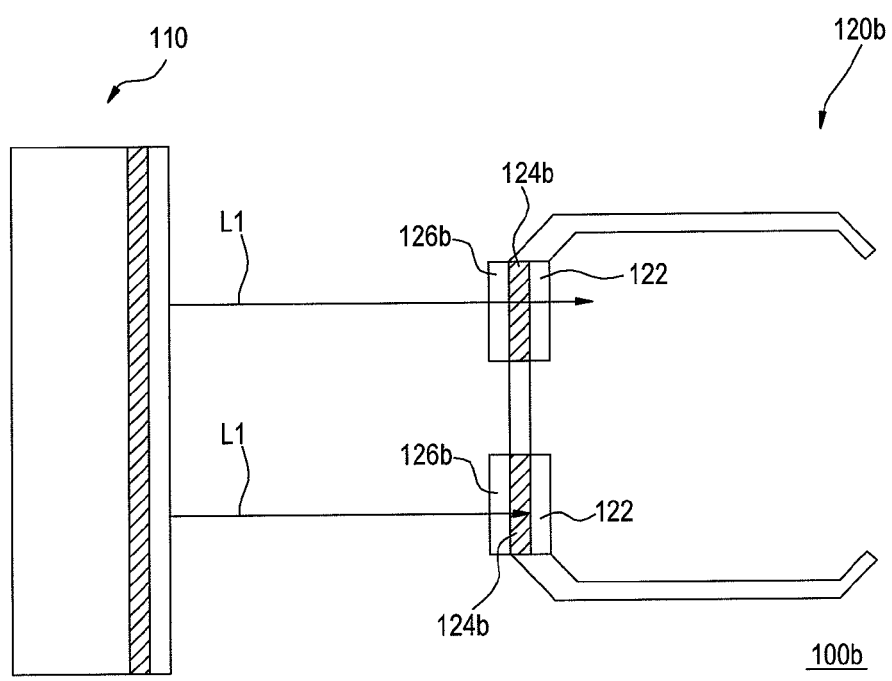
FIG. 1B is a schematic top view of a 3D image display system according to another embodiment of the present invention.

FIG. 1B is a schematic top view of a 3D image display system according to another embodiment of the present invention. Referring to FIG. 1B, a 3D image display system 100b of the embodiment includes a display equipment 110 and a shutter glasses 120b. The shutter glasses 120b is similar to the shutter glasses 120a of the above embodiment, except that the shutter glasses 120b includes two linear polarizing units 124b and two polarizing optical elements 126b, as shown in FIG. 1B.

In particular, the polarizing optical elements 126b are respectively corresponding to the liquid crystal optical units 122, and the linear polarizing units 124b are also respectively corresponding to the liquid crystal optical units 122. The linear polarizing units 124b are disposed between the polarizing optical elements 126b and the liquid crystal optical units 122, and each of the polarizing optical elements 126b may be attached on one of the linear polarizing units 124b. Thus, before the image light L1 enters to the liquid crystal optical units 122, the image light L1 still passes through the polarizing optical elements 126b and the linear polarizing units 124b in sequence.

The 3D image display systems 100b and 100a are the same in terms of advantages, functions, and principles of generating the stereoscopic visual effect, so that the details will not be described herein again. In addition, in other embodiments, the linear polarizing units 124b may be replaced by a single linear polarizing unit 124a, and the polarizing optical elements 126b may be replaced by a single polarizing optical element 126a. Therefore, the numbers of the linear polarizing units 124b and the polarizing optical elements 126b in FIG. 1B are merely illustrated as an example, and not limited the present invention.

Figure 2:
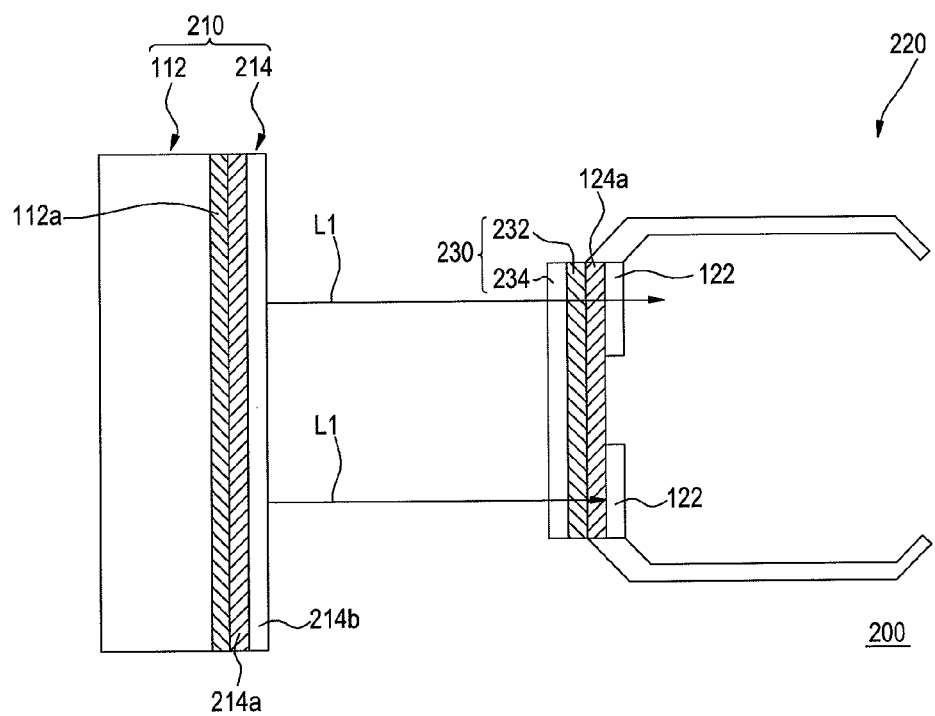
FIG. 2 is a schematic top view of a 3D image display system according to another embodiment of the present invention.

FIG. 2 is a schematic top view of a 3D image display system according to another embodiment of the present invention. Referring to FIG. 2, a 3D image display system 200 of this embodiment is similar to the 3D image display system 100a shown in FIG. 1A and includes a display equipment 210 and a shutter glasses 220. The display equipment 210 and the shutter glasses 220 are respectively similar to the display equipment 110 and the shutter glasses 120a in terms of construction, except that polarizing optical elements 214 and 230 used in the display equipment 210 and the shutter glasses 220 are different from the polarizing optical elements 114 and 126a.

In detail, the display equipment 210 includes an LCD module 112 and a polarizing optical element 214, and the shutter glasses 220 includes two liquid crystal optical units 122, a linear polarizing unit 124a, and a polarizing optical element 230. The polarizing optical elements 214 and 230 are both circular polarizers, and the circular polarizer includes a quarter-wave plate and a linear polarizer. That is to say, the polarizing optical element 214 includes a linear polarizer 214a and a quarter-wave plate 214b, and the polarizing optical element 230 includes a linear polarizer 232 and a quarter-wave plate 234.

In the display equipment 210, the polarizing optical element 214 may be attached on the linear polarizing unit 112a of the LCD module 112, and the linear polarizer 214a is located between the linear polarizing unit 112a and the quarter-wave plate 214b. An included angle between a polarization direction of the linear polarizer 214a and a fast axis (or a slow axis) of the quarter-wave plate 214b is equal to 45 degrees, and the linear polarizer 214a and the linear polarizing unit 112a have the same polarization direction, so that the image light L1 can pass through the polarizing optical element 230 and be converted into a circularly polarized light by the quarter-wave plate 214b.

In the shutter glasses 220, the polarizing optical element 230 may be attached on the linear polarizing unit 124a, and the linear polarizer 232 is located between the linear polarizing unit 124a and the quarter-wave plate 234. An included angle between a polarization direction of the linear polarizer 232 and a fast axis (or a slow axis) of the quarter-wave plate 234 is equal to 45 degrees, and the linear polarizer 232 and the linear polarizing unit 124a have the same polarization direction.

When the image light L1 emitted from the polarizing optical element 214 enters to the shutter glasses 220, the image light L1 passes through the quarter-wave plate 234, the linear polarizer 232, and the linear polarizing unit 124a in sequence. At this time, the quarter-wave plate 234 converts the image light L1 into a linearly polarized light with a polarization direction that is the same as the polarization direction of the linear polarizer 232, so that the image light L1 can pass through the linear polarizer 232 and the linear polarizing unit 124a, and enters to the LCD module 112.

It can be seen that since the polarizing optical element 214 of the display equipment 210 is capable of converting the image light L1 into the circularly polarized light, an included angle between the polarization directions of the linear polarizing unit 124a in the shutter glasses 220 and the polarization directions of the linear polarizing unit 112a in the display equipment 210 does not affect that the image light L1 passes through the shutter glasses 220. Therefore, the polarization directions of the linear polarizing unit 124a and the linear polarizing unit 112a do not affect the brightness of the images which have the stereoscopic visual effect and are provided by the 3D image display system 200 in the embodiment.

In addition, it is similar to the above embodiments that the 3D image display system 200 may also not use the polarizing optical element 214 or 230, but use only one polarizing optical element (for example, the polarizing optical element 214 or 230). That is to say, in the embodiment shown in FIG. 2, the polarizing optical element 230 of the shutter glasses 220 may be omitted, and only the polarizing optical element 214 of the display equipment 210 is used; or the polarizing optical element 214 may be omitted, and only the polarizing optical element 230 is used.

When the 3D image display system 200 uses only one polarizing optical element (that is, the polarizing optical element 214 or 230), the display equipment 210 still can normally display images, and the shutter glasses 220 still can block view of the eyes of the viewer in a timely manner. Therefore, even if the polarizing optical element 214 or 230 is not used, the 3D image display system 200 can also normally operate on the whole.

Moreover, the polarizing optical elements 214 and 230 are circular polarizer and thus are both capable of changing a polarization state of a light. Even if the 3D image display system 200 uses only the polarizing optical element 214 or 230, the included angle between the polarization directions of the linear polarizing unit 124a and the linear polarizing unit 112a does not affect that the image light L1 passes through the shutter glasses 220. Therefore, no matter whether both the display equipment 210 and the shutter glasses 220 have polarizing optical elements, or only one of the display equipment 210 and the shutter glasses 220 has a polarizing optical element, the image light L1 still can pass through the linear polarizing unit 124a without blocked.

It should be noted that although the number of the circular polarizer (that is, the polarizing optical element 230) included in the shutter glasses 220 in FIG. 2 is only one, in other embodiments, the shutter glasses 220 may also include two circular polarizers, and the circular polarizers are respectively corresponding to the liquid crystal optical units 122 and may be attached on the linear polarizing unit 124a. Besides, the single linear polarizing unit 124a shown in FIG. 2 may be replaced by the two linear polarizing units 124b shown in FIG. 1B. It can be seen that both numbers of the linear polarizing units 124a and the polarizing optical elements 230 in FIG. 2 are merely illustrated as an example and not limited the present invention.

Based on the above, since the shutter glasses alternately block view of a left eye and a right eye, and the display equipment alternately displays left-eye frames served for the left eye and right-eye frames served for the right eye, the 3D image display system of the present invention can provide images with a stereoscopic visual effect for a viewer, such that the viewer can see realistic stereoscopic images.

Moreover, the 3D image display system of the present invention may use at least one polarizing optical element, and the polarizing optical element is capable of changing the polarization state of the image light generated by the display equipment, such that the included angle between the polarization direction of the linear polarizing unit in the shutter glasses and the polarization direction of the linear polarizing unit in the display equipment does not affect that the image light passes through the shutter glasses. Therefore, when the viewer wears the shutter glasses to view images displayed by the display equipment, the brightness of the images will not change under the influence of the polarization directions of the linear polarizing unit and the linear polarizing unit, thereby preventing from reducing the viewer's enjoyment of the stereoscopic visual effect due to the abnormal variation in the brightness of the images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A 3D image display system, comprising:
a display equipment, comprising an LCD module, wherein the LCD module has a linear polarizing unit and is capable of generating an image light from the linear polarizing unit; and
a shutter glasses, comprising two liquid crystal optical units, at least one linear polarizing unit, and at least one polarizing optical element, wherein the linear polarizing unit is disposed between the polarizing optical element and the liquid crystal optical units, the image light passes through the polarizing optical element, the linear polarizing unit, and one of the liquid crystal optical units in sequence, and when the image light passes through one of the liquid crystal optical units, the other liquid crystal optical unit blocks the image light,
wherein the display equipment further comprises another polarizing optical element disposed on a transmission path of the image light and used for converting a polarization state of the image light from a linear polarization into a non-linear polarization.

2. The 3D image display system according to claim 1, wherein the polarizing optical element is a diffuser or a quarter-wave plate.

3. The 3D image display system according to claim 1, wherein the polarizing optical element is a circular polarizer.

4. The 3D image display system according to claim 3, wherein the circular polarizer comprises a quarter-wave plate and a linear polarizer, the linear polarizer is located between the linear polarizing unit and the quarter-wave plate, and the linear polarizer and the linear polarizing unit have a same polarization direction.

5. The 3D image display system according to claim 1, wherein the polarizing optical element is attached on the linear polarizing unit of the shutter glasses.

6. The 3D image display system according to claim 1, wherein a number of the polarizing optical element is two, and the polarizing optical elements are respectively corresponding to the liquid crystal optical units.

7. The 3D image display system according to claim 1, wherein the polarizing optical element of the display equipment is attached on the linear polarizing unit.

8. A 3D image display system, comprising:
a display equipment, comprising an LCD module and a polarizing optical element, wherein the LCD module has a linear polarizing unit and is capable of generating an image light from the linear polarizing unit, the polarizing optical element is disposed on a transmission path of the image light and used for converting a polarization state of the image light from a linear polarization into a non-linear polarization; and
a shutter glasses, comprising two liquid crystal optical units and at least one linear polarizing unit, wherein the liquid crystal optical units and the linear polarizing unit are located on the transmission path of the image light, the image light passes through the polarizing optical element, the linear polarizing unit, and one of the liquid crystal optical units in sequence, and when the image light passes through one of the liquid crystal optical units, the other liquid crystal optical unit blocks the image light.

9. The 3D image display system according to claim 8, wherein the polarizing optical element is a diffuser or a quarter-wave plate.

10. The 3D image display system according to claim 8, wherein the polarizing optical element is a circular polarizer.

11. The 3D image display system according to claim 10, wherein the circular polarizer comprises a quarter-wave plate and a linear polarizer, the linear polarizer is located between the linear polarizing unit and the quarter-wave plate, and the linear polarizer and the linear polarizing unit have a same polarization direction.

12. The 3D image display system according to claim 8, wherein the polarizing optical element is attached on the linear polarizing unit of the display equipment.

* * * * *